(12) United States Patent
Le Devehat

(10) Patent No.: US 8,033,536 B2
(45) Date of Patent: Oct. 11, 2011

(54) COUPLING WITH DIRECT TRANSMISSION OF THE ROTATIONAL MOVEMENT OF AN ACTUATION BOLT TO A CLAMPING JAW DRIVEN IN TRANSLATION BY THE LATTER

(75) Inventor: Renaud Le Devehat, Thorigny-sur-Oreuse (FR)

(73) Assignee: FMC Technologies SA, Sens (FR)

( * ) Notice: Subject to any disclaimer, the term of this patent is extended or adjusted under 35 U.S.C. 154(b) by 1103 days.

(21) Appl. No.: 10/585,228

(22) PCT Filed: Dec. 23, 2004

(86) PCT No.: PCT/EP2004/014902
§ 371 (c)(1),
(2), (4) Date: Jul. 2, 2007

(87) PCT Pub. No.: WO2005/064177
PCT Pub. Date: Jul. 14, 2005

(65) Prior Publication Data
US 2007/0278793 A1 Dec. 6, 2007

(30) Foreign Application Priority Data
Dec. 30, 2003 (FR) ...................................... 03 15578

(51) Int. Cl.
*B25B 1/10* (2006.01)
(52) U.S. Cl. ................ 269/244; 29/255; 29/270; 269/32
(58) Field of Classification Search ................. 269/244, 269/24–27, 32, 228; 29/244, 255, 270
See application file for complete search history.

(56) References Cited

U.S. PATENT DOCUMENTS

| 3,661,408 | A |  | 5/1972 | Gibbons |  |
|---|---|---|---|---|---|
| 3,830,533 | A |  | 8/1974 | Mezei et al. |  |
| 4,198,076 | A |  | 4/1980 | Mezei |  |
| 5,695,177 | A | * | 12/1997 | Mascola | 269/24 |
| 5,916,325 | A |  | 6/1999 | Madrid et al. |  |
| 6,059,277 | A | * | 5/2000 | Sawdon et al. | 269/24 |
| 6,113,086 | A | * | 9/2000 | Yonezawa | 269/24 |
| 6,237,905 | B1 | * | 5/2001 | Halder et al. | 269/32 |
| 6,364,302 | B2 | * | 4/2002 | Ausilio | 269/32 |
| 6,409,162 | B1 | * | 6/2002 | Belusko | 269/71 |
| 6,736,384 | B2 | * | 5/2004 | Yokota | 269/32 |
| 6,886,820 | B1 | * | 5/2005 | Hausler, III | 269/24 |
| 2007/0278793 | A1 | * | 12/2007 | Le Devehat | 285/390 |

FOREIGN PATENT DOCUMENTS

EP 0 285 813 A1 3/1988

* cited by examiner

*Primary Examiner* — Lee D Wilson

(57) ABSTRACT

A coupling for securing a first element to a second element includes an actuation bolt, a clamping jaw mounted on the first element which comprises a bore having a threaded part which defines a nut that threadedly engages the actuation bolt, and a torque limitation device positioned between the actuation bolt and the bore for transmitting the rotational movement of the actuation bolt directly to the clamping jaw to thereby rotate the clamping jaw about the axis. In operation, when an external force acting on the clamping jaw is greater that the force generated against the bore by the torque limitation device, rotation of the actuation bolt will result in translation of the clamping jaw, and when the external force acting on the clamping jaw is less than the force generated against the bore by the torque limitation device, rotation of the actuation bolt will rotate the clamping jaw about the axis.

13 Claims, 3 Drawing Sheets

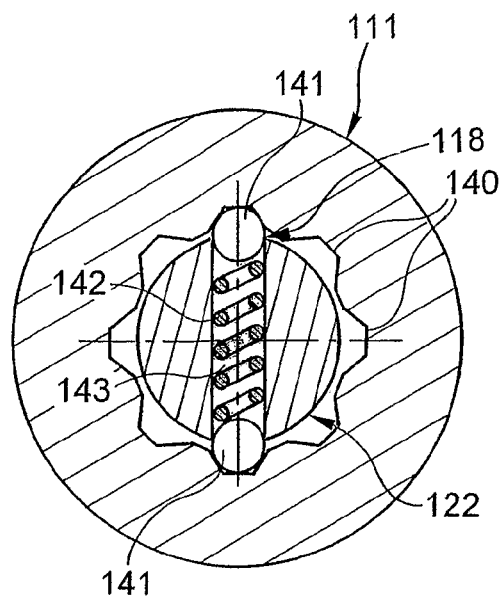
Fig.3
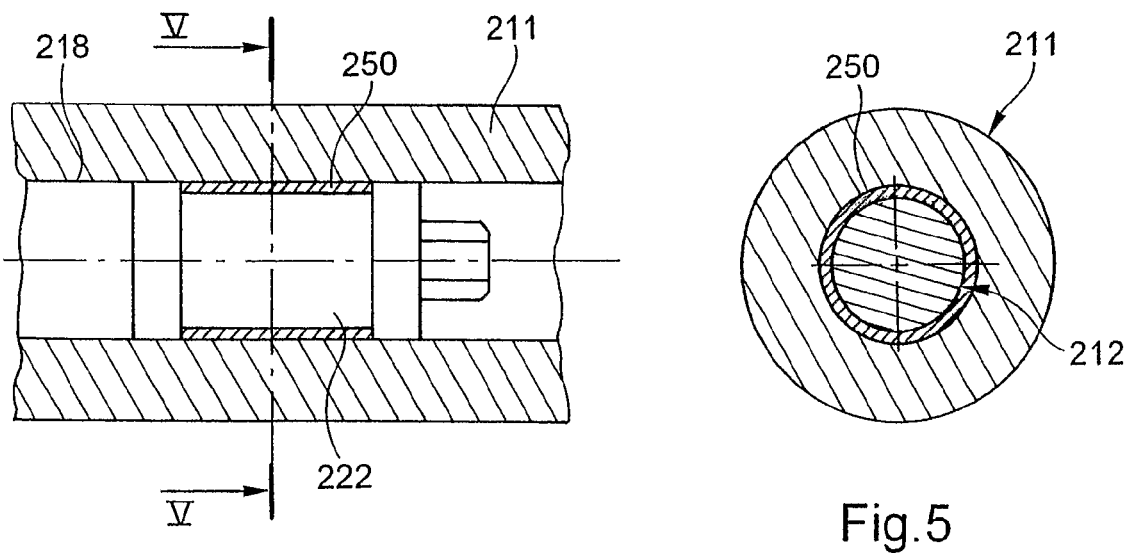
Fig.4
Fig.5

COUPLING WITH DIRECT TRANSMISSION OF THE ROTATIONAL MOVEMENT OF AN ACTUATION BOLT TO A CLAMPING JAW DRIVEN IN TRANSLATION BY THE LATTER

BACKGROUND OF THE INVENTION

The present invention relates, in a general fashion, to couplings, in particular for loading arms.

As is already known, a coupling is a mechanical assembly comprising clamping modules, intended in particular to apply a clamping preforce so as to ensure the mechanical linkage and tightness between an articulated arm for loading and unloading products, in particular fluid products, such as for example petroleum products (liquefied natural gas etc.), and a complimentary means installed on a vessel.

The present invention is more particularly aimed at the case where the coupling is a hydraulic coupling with several clamping modules, in practice three or more, capable of conveying liquid products, in particular at very low temperatures (up to −196° C.).

According to an arrangement which is already known, each clamping module comprises a clamping jaw for clamping which is designed to couple the arm to a complimentary means, such as a manifold, and, for this clamping jaw, an actuation system comprising a device of the bolt/nut type driven by a motor.

A first system, known and marketed by the applicant, uses a device of the bolt/nut type arranged in a way so as to reproduce the action of a jack, the bolt being driven in rotation by a hydraulic motor via a chain.

This system actuates an assembly of three connecting rods which are linked to each other and two of which have one of their ends connected to a fixed point.

This configuration allows reduction of the clamping force on the flange and tilting of the whole module in order to open or close the coupling.

According to the same principle, a development without connecting rods has been proposed to overcome this drawback while reducing the space requirement and the weight of the device. This development is described in the French Patent Application No. 2834327.

In another device which is already known, the coupling uses compression springs of large diameter each connected at one of their ends to a clamping jaw and at the other to a ring designed to be actuated in rotation.

The inclination of this ring corresponds to the inclination of the springs which, depending on the latter, apply more or less pressure on the clamping jaw which clamps the flange of a complimentary means of the loading arm.

In their compressed position the springs deliver a maximal clamping torque.

The use of a hydraulic jack to activate the ring in rotation means that the mechanism becomes reversible and in the case of a failure of the hydraulic system this can lead to a progressive loosening of the flange.

Another known coupling uses a cam driven in rotation by a hydraulic jack.

This cam applies a load to the clamping jaw to close the coupling and incorporates a parallel irreversibility system in the case of a hydraulic failure.

Another coupling continues the principle of the cam with a toothed rotary washer positioned on the periphery of the coupling. This washer pivots under the pressure of a hydraulic jack and pushes the assembly of the clamping jaw thanks to the teeth which compose it to capture the flange.

According to another existing device, the coupling uses a device of the bolt/nut type, more reliable than a hydraulic jack, to drive the clamping jaw in rotation, the nut being in tilting connection with the latter.

The rotation of the bolt drives the translational movement of the nut which thanks to said tilting connection with the clamping jaw drives the latter in rotation about an axis perpendicular to the axis of translation of the nut, to clamp or release the flange according to the direction of rotation of the bolt.

An emergency release system is provided in parallel, in order to increase the responsiveness of the system during an opening phase in an emergency procedure.

Some known devices, of the same sort as those described above, are in particular disclosed in the patent applications or patents EP-A 0 285 813, U.S. Pat. Nos. 4,222,591, and 3,661,408 and GB-A-1 395 928.

Finally, there exists a coupling device which is known and which is marketed by the Applicant under the name <<Quikcon2>>.

This device has a clamping jaw which combines two movements: a rotation and a translation respectively about and along the same axis.

The clamping jaw overall presents the shape of the letter <<L>>, the base of the <<L>> being the part which effectively serves to grip the flange and its vertical (<<long>>) part corresponding to the axis of said combined rotation and translation.

This last part, which is longer, is introduced into a bore of the frame of the coupling module.

The guiding in rotation of the clamping jaw in this bore is carried out by a ball mounted there between, sliding inside a helical path machined in the <<long>> part of the clamping jaw and held in a specific housing installed in said bore integral with the frame of the coupling module.

The operation of the clamping jaw is carried out using a nut device integral with the clamping jaw and bolt advantageously collaborating with the latter and driven in rotation by an suitable means (hydraulic motor for example).

The bolt and the nut are located in the axis of rotation and translation mentioned above.

In practice, the bolt and the nut are located at the centre of the <<long>> part of the clamping jaw which has a longitudinal bore created for this purpose.

The above-mentioned helical path has a favourable shape which allows transformation of the movement of translation of the clamping jaw imposed by the rotation of the bolt/nut system into a movement of rotation combined with said movement of translation, these two movements occurring respectively about and along the same above-mentioned axis.

Thus, during the closing phase of the clamping jaw a rotation of the latter is initially observed, which rapidly ensures the coupling of the two elements to be coupled, then a translation corresponding to the clamping of said elements together.

The ball is however not designed to withstand high stresses which can, for example, result from an impact between the clamping jaw and an external element.

Thus, the ball can be subject to a permanent deformation or to a mechanical break and the machining of the helical path can also be damaged.

The ball and the helical path can also be damaged by other mechanical stresses due to an opening or a closure in difficult conditions (for example: foreign bodies in the mechanism, corrosion factors, etc.).

In addition, a clamping jaw comprising such helical machining is expensive to manufacture.

SUMMARY OF THE INVENTION

A subject of the present invention is, in a general way, an arrangement allowing improvement of the latter device and leading moreover to other advantages.

More specifically, its subject is a coupling of the sort comprising at least one clamping jaw adapted to be installed on a first element in order to couple the latter to a second element by clamping the second element against the first element, the clamping or the release of the second element resulting from a translational movement following an axis, while the disengagement or the capture of this second element is due to a rotational movement of the clamping jaw about the same axis, the clamping jaw comprising a bore having a threaded part forming a nut in which is engaged an actuation bolt defining said axis and able to drive the clamping jaw in translation following the latter, characterized in that torque limitation means capable of engaging the actuation bolt and the clamping jaw, using the bore of this clamping jaw, allow transmission of the rotational movement of the actuation bolt directly to the clamping jaw and, consequently, the driving of this clamping jaw in rotation about said axis.

In other words, the movement of the clamping jaw breaks down into a translation and a rotation about the same axis, with the advantage of combining these two movements almost immediately after the actuation of the bolt/nut system both in the opening phase and in the closing phase of the coupling.

The closing movement of the clamping jaw breaks down into a translation by the bolt/nut system, immediately combined with a rotation about the axis of the main bolt by driving of the clamping jaw by this bolt, allowing the immediate capture of the second element, while the translation continues until there is complete closure and clamping of the second element against the first by the clamping jaw.

The opening movement of the clamping jaw uses the same principle in reverse: it begins with a translation by the bolt/nut system, coupled with the rotation for the disengagement of the second element as soon as the clamping forces applied between the clamping jaw and the second element are removed while the translation continues until there is complete opening of the clamping jaw at the end of its displacement.

Thus, this system allows great responsiveness in use because the rotation of the clamping jaw is carried out in a very short amount of time, which allows release or engagement of the clamping jaw onto the accessory.

This system is moreover simpler and more reliable than the embodiments known to date.

According to preferred characteristics relating to this arrangement:

- the torque limitation means comprise at least one spring capped with a pusher at each of its longitudinal ends;
- the torque limitation means are presented in the form of a coating of abrasive material covering the internal surface of the bore in contact with a clamping nut engaged on the actuation bolt or a part of the bolt itself, or vice-versa;
- the torque limitation means are presented in the form of an element in a material which has high frictional properties, in particular rubber, interposed between the actuation bolt or a clamping nut engaged on the latter and the internal surface of the bore of the clamping jaw;
- the torque limitation means comprise teeth arranged symmetrically on the periphery of a clamping nut engaged on the actuation bolt or on the bolt itself and meshing in grooves machined in the bore of the clamping jaw, or vice-versa;
- the torque limitation means are presented in the form of balls housed in a clamping nut engaged on the actuation bolt or in the bolt itself and forced into contact with the internal surface of the bore, preferably grooved, of the clamping jaw by at least one spring, or vice-versa;
- the torque limitation means result from the natural friction between the actuation bolt and the thread of the part forming the bolt of the bore of the clamping jaw;
- a rolling bearing, in particular a needle rolling bearing, is installed on the actuation bolt and constitutes a stop for the end of translational travel of the clamping jaw;
- the clamping jaw is guided in translation by a frame adapted to be fixed to the first element;
- the actuation bolt is driven by a motor, preferably a hydraulic motor, in particular using a toothed wheel gearing;
- the motor is a motor specific to the actuation bolt; and
- the clamping jaw overall presents an L-shape, the threaded bore being provided in the longer branch of the L.

BRIEF DESCRIPTION OF THE DRAWINGS

Moreover the characteristics and advantages of the invention will emerge from the description which follows, by way of example, with reference to the attached schematic drawings in which:

FIG. 3 is a cross-section view, on a smaller scale, of a torque limiting device with springs according to a variant of the embodiment of the invention; and FIGS. 4 and 5 are cross-section views respectively longitudinal and transversal (following the V-V line of FIG. 4) of a torque limiting device comprising a friction material.

DETAILED DESCRIPTION OF THE INVENTION

Figure 1:
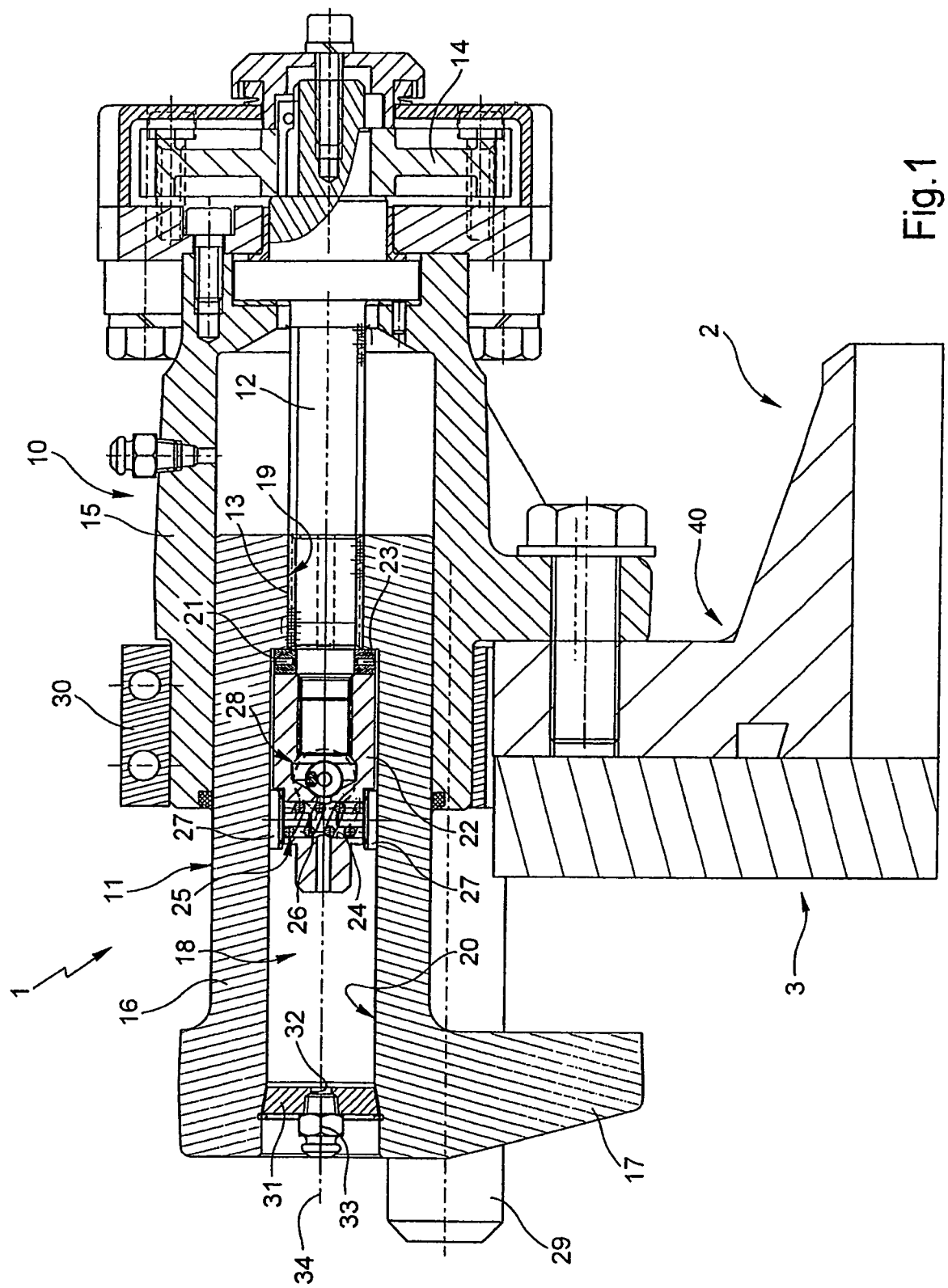
FIG. 1 is a cross-section view of a coupling mounted on a loading arm and equipped with a clamping assembly according to the invention and with a complimentary means, in a non-coupled position.
Figure 2:
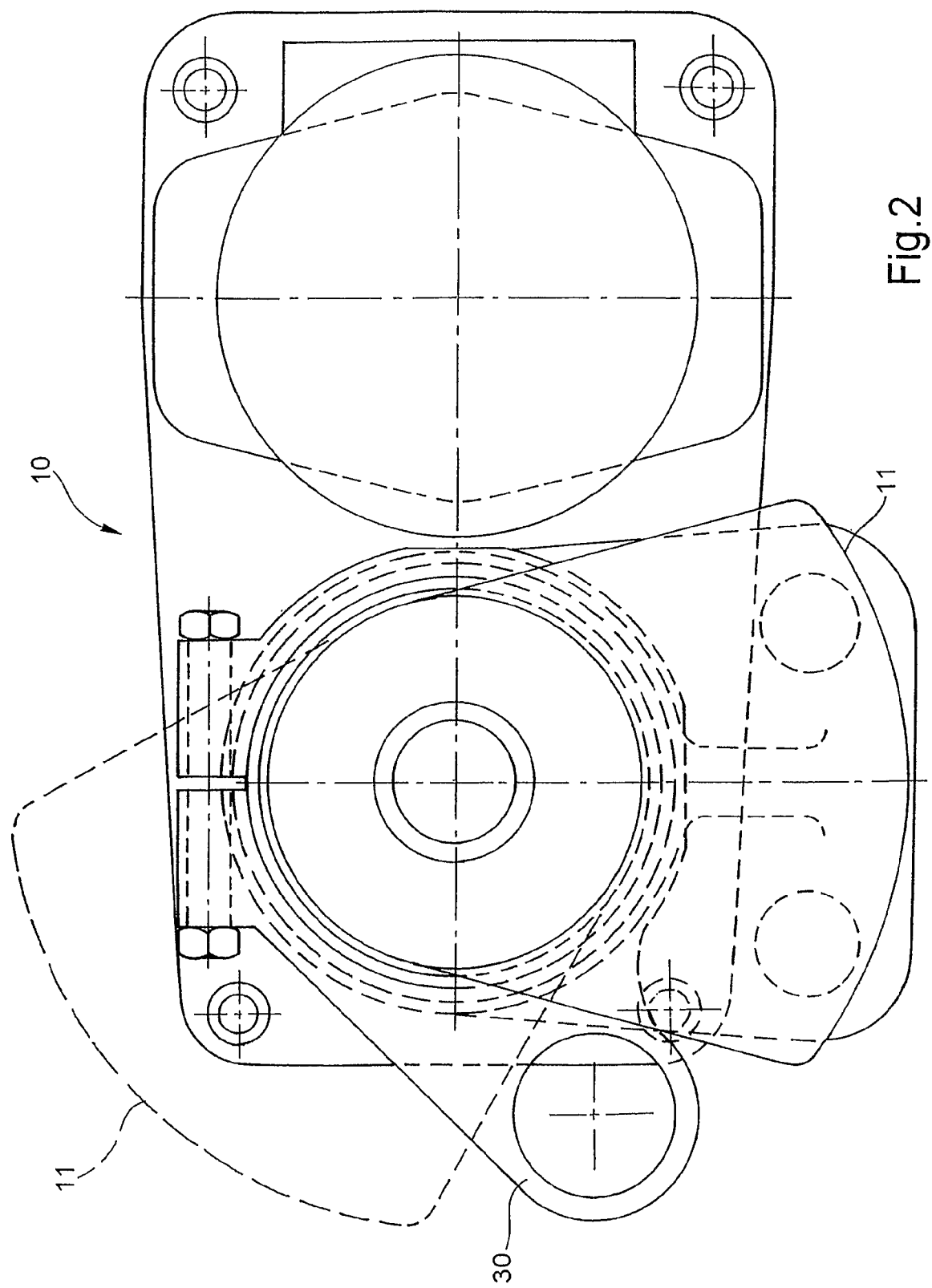
FIG. 2 is a front view of the front of this coupling, illustrating the two extreme positions of the clamping jaw.

In the embodiment presented in FIGS. 1 and 2, the coupling 1, here of hydraulic type, comprises a clamping module 10 having a clamping jaw 11 designed to couple the end of a loading arm 2 on which is mounted (here by a bolt connection) the coupling 1, to a complimentary means 3, here a manifold equipped with a flange, and, for this clamping jaw 11, a specific actuation system comprising a device of the bolt 12/nut 13 type driven in rotation, here by a toothed wheel 14, itself driven by a second toothed wheel (not shown on the figures) integral with the axle of a motor, here of hydraulic type, not shown in the figures but mounted on the frame 15 of the clamping module 10 lateral to the clamping jaw 11 and to its actuation bolt 12 (to the right of the clamping jaw 11 in FIG. 2).

This frame 15 is designed to guide in translation the longer branch 16 of the clamping jaw 11, which overall presents an L-shape and the shortest branch of which 17 forms a claw for clamping the flange 3 of the manifold against the flange of the front end 40 of the loading arm 2.

This clamping jaw 11 presents, moreover, a bore 18 in two parts 19, 20 separated by a shoulder 21.

The part 19 of this bore opens onto the outside of the clamping jaw 11 at its end opposite to that presenting the branch 17 forming a claw via a part forming a nut 13 of the clamping jaw 11, which is intended to cooperate with the bolt 12.

A clamping nut 22 is, moreover, screwed onto the front end of the bolt 12 and a needle roller bearing 23 is mounted on this bolt 12, between the clamping nut 22 and the threaded part of the bolt 12 intended to cooperate with the part forming nut 13 of the clamping jaw 11.

According to the invention, the clamping nut 22 presents a transverse hole 24 with the aid of which is housed a torque limiter 25 which is presented in the form of a spring 26 which is capped, at its two longitudinal ends, by two pushers 27 capable of cooperating with the internal surface of the part 20 of the bore 18.

A second torque limiter 28, identical to the torque limiter 25 is, moreover, housed in the clamping nut 22, perpendicular to this torque limiter 25.

Moreover, a stop bar 29 is provided which is fixed by a collar 30 around the frame 15, at the front end of the latter.

The front end of the clamping jaw 11 is closed by a plug 31 equipped with an orifice 32 in which is housed a lubricator 33 for the bore 18.

The system for driving the bolt 12 by the toothed wheels and the hydraulic motor, as partially represented at the rear end of the frame 15, by themselves not forming part of the present invention, will not be described in any more detail here.

The closing movement of the clamping jaw 11 thus breaks down into a translation by the bolt 12/nut 13 system, immediately combined with a rotation about the axis of the bolt 12 by driving the clamping jaw 11 by this bolt 12, allowing the immediate capture of the complimentary means 3, while the translation continues until there is complete closure and clamping of the complimentary means 3 by the clamping jaw 11 against the flange of the loading arm 2.

The opening movement of the clamping jaw 11 uses the same principle in reverse: it begins with a translation by the bolt 12/nut 13, system coupled with the rotation for the disengagement of the complimentary means 3 as soon as the clamping forces applied between the clamping jaw 11 and the complimentary means 3 are removed while the translation continues until there is complete opening of the clamping jaw 11 at the end of its displacement.

As indicated above, the invention in its preferred embodiment is equipped with torque limiters 25, 28 of spring-type.

More precisely, upon opening, the bolt 12 is driven in rotation by the motor via the toothed wheel 14 and then moves in translation the clamping jaw 11.

As long as the clamping torque of the clamping jaw 11 on the complimentary means 3 is greater than the frictional force applied by the springs of the torque limiters 25, 28, these springs "glide" inside the clamping jaw 11.

When the clamping jaw 11 does not apply a sufficient force to the complimentary means 3, the pushers 27 adhere to the inside of the clamping jaw 11 and drive the latter in rotation about axis 34 defined by the bolt 12; it disengages by approximately ⅔ of a turn until arriving at a stop on the stop bar 29.

The translation movement of the clamping jaw 11 continues until it arrives at the end of its displacement stopped on the needle roller bearing 23 situated on the bolt.

As regards closure, the clamping torque applied on the clamping jaw 11 logically being nil at the start of the manoeuvre (clamping jaw in open position), the rotation of the latter is immediate, the springs of the torque limiters 25, 28 applying a frictional force on the clamping jaw 11 in order to drive it in rotation, by means of pushers 27.

According to another embodiment, the torque limiter can be a device with balls and spring such as represented in FIG. 3.

In this case, the bore 118 of the clamping jaw 111 presents grooves 140 in which the balls 141 engage, which are pushed by a spring 142 housed in a transverse bore 143 of the clamping nut 122 of the actuation bolt provided for this purpose.

The number of torque limiters of the sort described in reference to FIGS. 1 to 3 is, in practice, comprised between 1 and 4.

According to yet another embodiment of the invention, the torque limiter can be a device comprising a friction material, as represented in FIGS. 4 and 5.

In this embodiment, a sleeve 250 in material having high frictional properties, for example rubber, is interposed between the bore 218 of the clamping jaw 211 and the outer surface of the clamping nut 222 of the actuation bolt.

The fit between these three pieces can be tight, in order to transmit a higher torque.

As a variant, the internal surface of the clamping jaw can be covered with an abrasive material directly in contact with the clamping nut of the actuation bolt, allowing the driving in rotation of the clamping jaw by friction.

Also as a variant, the balls housed in the clamping nut and forced into contact with the inside of the clamping jaw by a spring (or vice-versa balls housed in the clamping jaw and forced by springs also housed in the clamping jaw into contact with a grooved clamping nut) can be replaced by teeth arranged symmetrically on the periphery of the clamping nut and which mesh with grooves machined in the clamping jaw, driving this clamping jaw in rotation if the clamping torque of the flange is sufficiently low, and thus reproducing the principle of a torque limiter. These teeth and grooves are advantageously produced from a material with a high wear resistance.

Finally, according to the configuration of the mechanism, the natural friction of the actuation bolt on the nut formed by the clamping jaw can be sufficient to drive the clamping jaw in rotation.

The hydraulic functioning of the coupling according to the invention is, preferably, the same as that used for the coupling described in the aforementioned French Patent Application No. 2 834 327: the hydraulic motor of each module is supplied according to an arrangement in series (low pressure and high flow) so that the clamping jaws do not apply any clamping force on the complimentary means and according to an arrangement in parallel (high pressure and low flow) when the clamping jaws apply a clamping force, so as to distribute the force uniformly between each module, and to adapt to any lack of surface evenness of the clamped flanges.

The hydraulic block discussed within the scope of the invention described in this patent application to supply the hydraulic motors of each of the clamping modules comprises a slide valve equipped with a return spring and a pressure limiter placed upstream of the valve. This hydraulic block has been designed to provide the flow and the oil pressure required, and allows operation according to the series/parallel principle described previously.

Of course, it is also possible to use several clamping modules of the type described above within the scope of the present invention.

It will be appreciated that the closing system according to the invention allows great flexibility in use, because the rotation of the clamping jaw is carried out in a very short amount of time, which produces excellent responsiveness for the operator during the approach of the loading arm.

In addition, emergency release operations are facilitated by the responsiveness of this new system, which turns out to be particularly advantageous, amongst other things for arms which do not have an emergency release system (ERS).

In fact, on opening, the rotation of the clamping jaw occurs, in practice, after only one to two seconds (the amount of time in which the pushers of the preferred embodiment adhere to the internal surface of the clamping jaw), completely freeing the connected arm, in contrast to the known closing system which does not have this speed of disengagement.

It is also to be noted that in the case of a hard spot in the clamping jaw impeding the driving in rotation of the latter by the friction system, the arrival of the clamping nut in the stop position causes the forced rotation of the clamping jaw towards the closed position (the solid line position in FIG. 2) with the maximum torque applied to the adjusting spindle.

Moreover, the bolt/nut system allows irreversibility of the process in the case of a hydraulic failure: where a jack would gradually work loose in the absence of hydraulic power supply, the bolt/nut system remains in place in the closed position, maintaining an almost constant clamping torque.

It is finally to be noted that one clamping module can be used for a wide range of coupling diameters, thus adapting to the diversity of thicknesses of matching flanges—which can range from the single to the double—while retaining the same clamping force thanks to the hydraulic principle which has been presented above with reference to the French Patent Application No. 2 834 327.

Of course, the present invention is not limited to the type of embodiment described and represented, but encompasses any variant of execution.

The invention claimed is:

1. A coupling for securing a first element to a second element, the coupling comprising:
   an actuation bolt which comprises a longitudinal axis;
   a clamping jaw which is mounted on the first element and which comprises a bore having a first part which defines a nut that threadedly engages the actuation bolt and a second part within which the actuation bolt extends; and
   torque limitation means positioned between the actuation bolt and the second part of the bore for transmitting the rotational movement of the actuation bolt directly to the clamping jaw to thereby rotate the clamping jaw about the axis;
   wherein when an external force acting on the clamping jaw is greater that the force generated against the bore by the torque limitation means, rotation of the actuation bolt will result in translation of the clamping jaw along the axis; and
   wherein when the external force acting on the clamping jaw is less than the force generated against the bore by the torque limitation means, rotation of the actuation bolt will rotate the clamping jaw about the axis.

2. A coupling according to claim 1, wherein the torque limitation means comprise at least one spring which is capped by a pusher at each of its longitudinal ends.

3. A coupling according to claim 1, wherein the torque limitation means comprises a coating of an abrasive material which is formed on at least one of the actuation bolt, a clamping nut which is secured to the actuation bolt within the second part of the bore, or the second part of the bore.

4. A coupling according to claim 1, wherein the torque limitation means comprises a material having high frictional properties which is interposed between the second part of the bore and at least one of the actuation bolt or a clamping nut which is secured to the actuation bolt.

5. A coupling according to claim 1, wherein the torque limitation means comprises teeth which are arranged symmetrically on at least one of the actuation bolt or a clamping nut which is secured to the actuation bolt and which mesh with grooves machined in the second part of the bore.

6. A coupling according to claim 1, wherein the torque limitation means comprises a number of balls which are housed in at least one of the actuation bolt or a clamping nut which is secured to the actuation bolt and which are forced into contact with the second part of the bore by at least one spring.

7. A coupling according to claim 1, further comprising a rolling bearing which is mounted on the actuation bolt and which functions as a stop for the end of translational travel for the clamping jaw.

8. A coupling according to claim 1, wherein the clamping jaw is guided in translation by a frame which is adapted to be fixed to the first element.

9. A coupling according to claim 1, wherein the actuation bolt is driven by a motor through a number of toothed wheels.

10. A coupling according to 9, wherein the motor comprises a hydraulic motor.

11. A coupling according to claim 1, wherein the clamping jaw comprises an L-shaped configuration and the nut is located in the longer branch of the L.

12. A coupling according to claim 6, wherein the second part of the bore comprises a number of grooves into which the balls are forced.

13. In combination with a loading arm for transferring a fluid product from a first component to a second component, the improvement comprising a coupling for securing the first component to the second component, the coupling comprising:
   an actuation bolt which comprises a longitudinal axis;
   a clamping jaw which is mounted on the first component and which comprises a bore having a first part which defines a nut that threadedly engages the actuation bolt and a second part within which the actuation bolt extends; and
   torque limitation means positioned between the actuation bolt and the second part of the bore for transmitting the rotational movement of the actuation bolt directly to the clamping jaw to thereby rotate the clamping jaw about the axis;
   wherein when an external force acting on the clamping jaw is greater that the force generated against the bore by the torque limitation means, rotation of the actuation bolt will result in translation of the clamping jaw along the axis; and
   wherein when the external force acting on the clamping jaw is less than the force generated against the bore by the torque limitation means, rotation of the actuation bolt will rotate the clamping jaw about the axis.

* * * * *